May 26, 1936. G. FOX ET AL Re. 19,980
TUYÈRE
Original Filed May 14, 1934 4 Sheets-Sheet 1
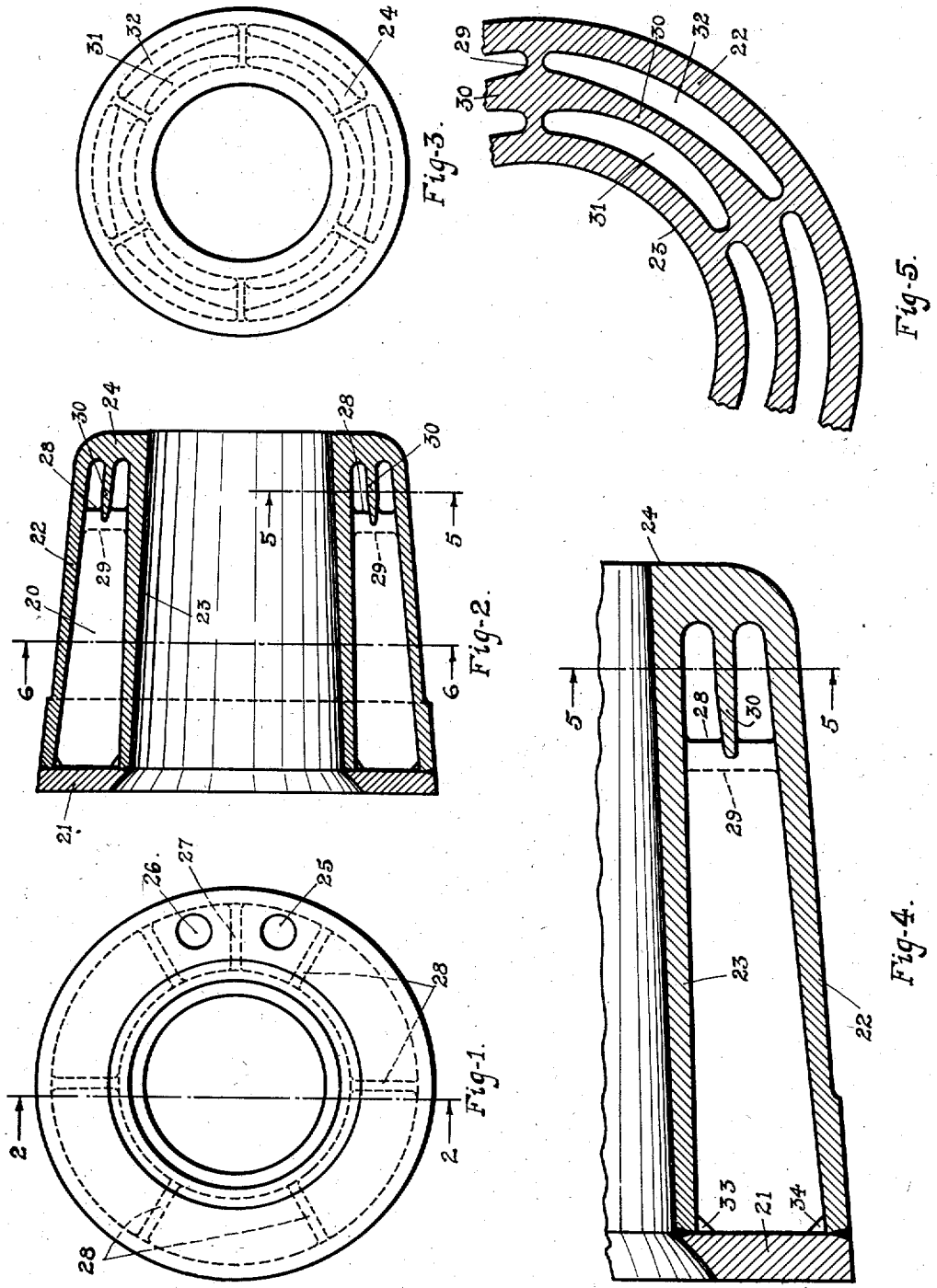
Inventors
Gordon Fox.
Arthur J. Whitcomb.
By Wilkinson Hopley, Byron & Knight
Attys.

TUYÈRE

Original Filed May 14, 1934 4 Sheets-Sheet 2

Inventors
Gordon Fox.
Arthur J. Whitcomb.
By Wilkinson Huxley, Byron & Knight.
Attys.

May 26, 1936. G. FOX ET AL Re. 19,980

TUYÈRE

Original Filed May 14, 1934 4 Sheets-Sheet 3

Inventors
Gordon Fox
Arthur J. Whitcomb

By Wilkinson, Huxley, Byron & Knight
Attys

May 26, 1936. G. FOX ET AL Re. 19,980

TUYÈRE

Original Filed May 14, 1934 4 Sheets-Sheet 4

Inventors
Gordon Fox.
Arthur J. Whitcomb.
By Wilkinson Huxley, Byron & Knight.
Attys.

Reissued May 26, 1936 Re. 19,980

UNITED STATES PATENT OFFICE 19,980

TUYÈRE

Gordon Fox and Arthur J. Whitcomb, Chicago, Ill., assignors to Freyn Engineering Company, Chicago, Ill., a corporation of Maine Original No. 1,969,693, dated August 7, 1934, Serial No. 725,622, May 14, 1934. Application for reissue February 14, 1935, Serial No. 6,598

22 Claims. (Cl. 122—6.6)

The present invention relates to improvements in tuyères.

More particularly the present invention relates to improvements in tuyères such as are used in blast furnaces. Such tuyères are subjected to very high temperatures. Such high temperatures are due in part to direct radiation and conduction from the flames within the furnace and from the hot blast and in part to the conduction of heat directly from molten metal which has been splashed upon the tuyère or has otherwise contacted therewith. It has been common to cool blast furnace tuyères by attempting to circulate water through the interior chamber of the tuyère. It is a well known fact that a given amount of water which passes along a surface slowly has less cooling effect than water which passes that surface rapidly. Moreover, a given amount of water in a thick stream is less effective than in a thin stream which has more intimate contact. Also, as water is an extremely poor conductor of heat, unless the circulation of the water is good, it is very probable that steam is generated by the evaporation of a layer of water which lies immediately adjacent to the hot tuyère wall surface. This steam expands and thereby acquires a larger surface in contact with the cooling water. The heat of the steam is rather slowly absorbed by the water, causing the steam to be condensed and the temperature of the cooling water to be raised. According to certain prior practice with which applicants are familiar, the flow of water has not been effective in removing bubbles of steam from the wall surfaces, and the bubbles doubtless form a fairly efficient heat insulation between the inner wall surface and the water, further exaggerating the required temperature difference to give the required heat transfer. A further objection which has applied to water-cooled tuyères of designs with which applicants are familiar is that there is considerable danger that the steam generated will not be sufficiently promptly condensed but that because of its great volume it may diminish the amount of water circulated and cause the tuyère to become steam-bound.

An object of the present invention is to provide a water-cooled tuyère having improved means to cause the cooling water to take a circuitous path through passages of restricted area, thereby increasing the velocity of flow of said cooling water and increasing its cooling effectiveness.

A further object is to provide a tuyère which will expose increased area of cooling surface to the cooling water of the tuyère, particularly in those portions of the tuyère exposed to the most heat, such cooling surface having effective metallic connection for flow of heat from the exposed outer surfaces to the extended inner surfaces.

A further object is to provide a tuyère in which the stream of cooling medium is caused to pass in a relatively thin stream and thus to make intimate contact with the metal surfaces.

A further object is to provide a tuyère in which all of the water passing through the tuyère is caused to traverse all parts of the nose portion of the tuyère and thus to be available to meet emergency cooling requirements, such as splashes of molten metal.

A further object is to provide a tuyère which will combine the advantages of increased velocity of water flow with increased cooling area for dissipating the heat from the nose of the tuyère.

A further object is to provide a tuyère having means for dissipating heat from one portion of the tuyère to the other, thereby tending to equalize the temperatures of the various portions of the tuyère.

A further object is to provide an improved tuyère in which the temperature-equalizing means above referred to also serve to mechanically strengthen the tuyère to resist expansion and contraction stresses.

A further object is to provide an improved tuyère having the advantage that cooling water will be directed therethrough at relatively high velocity, the means for directing the cooling water at such high velocity also serving to minimize temperature differences in various parts of the tuyère, and also serving to increase the mechanical strength of the tuyère.

A further object is to provide a tuyère having means for increasing the effectiveness of heat transfer from the inner surfaces of the water chamber to the cooling water by increasing the velocity of flow of said water, and, in combination therewith, having conducting material of sufficient section, suitably disposed and suitably proportioned to bring to those water chamber surfaces, with moderate temperature gradients, the additional amounts of heat which they are enabled to dissipate because of the increased velocity of flow of cooling water past said surfaces.

A further object is to provide a tuyère having in the nose region thereof a liberal amount of metal which in normal operation will have low temperature and which will have good conductive relation (through close proximity and ample metallic section) with the exposed outer surfaces in the nose region of the tuyère as a means for absorbing heat from molten metal in a blast furnace or the like which may occasionally contact the tuyère in the nose region thereof.

A further object is to provide a tuyère which is economical to manufacture and which will have a relatively long life in service.

A further object is to provide a tuyère which will effectually meet the needs of commercial service.

Further objects will appear as the description proceeds.

Referring to the drawings—

Figure 1 is an end view showing the base of a tuyère embodying the principles of the present invention;

Figure 2 is a longitudinal sectional view taken along the plane indicated by the arrows 2—2 of Figure 1, the dotted lines representing the forward barriers being omitted for clarity;

Figure 3 shows the nose end of the tuyère, the circle representing the base of the tuyère and the dotted lines representing the rearmost barriers being omitted for clarity;

Figure 4 is a view on an enlarged scale showing a portion of the structure illustrated in Figure 2;

Figure 5 is a fragmentary view showing a section taken along the plane indicated by the arrows 5—5 of Figures 2 and 4;

Figure 9:
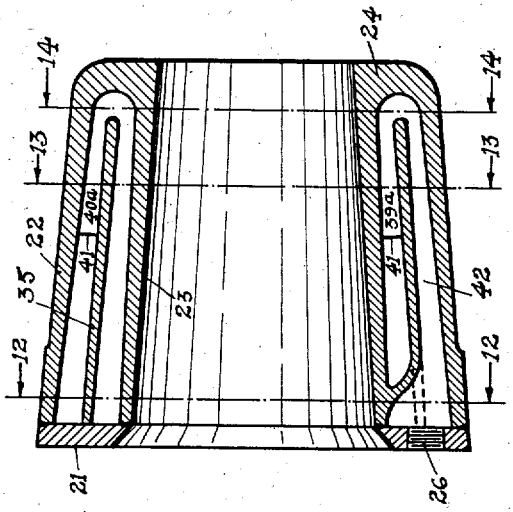
Figure 9 is a longitudinal sectional view taken along the plane indicated by the arrows 9—9 of Figure 8.
Figure 8:
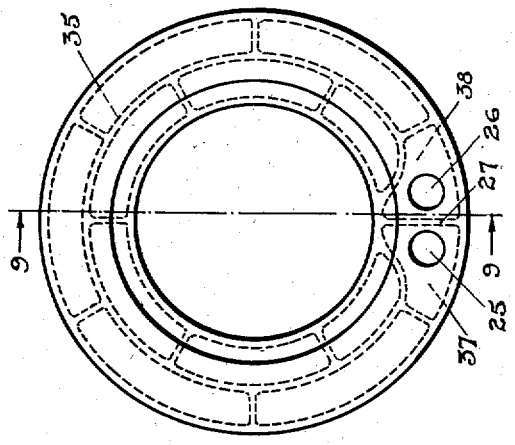
Figure 8 is an end view showing the base of a tuyère embodying a modified construction.
Figure 11:
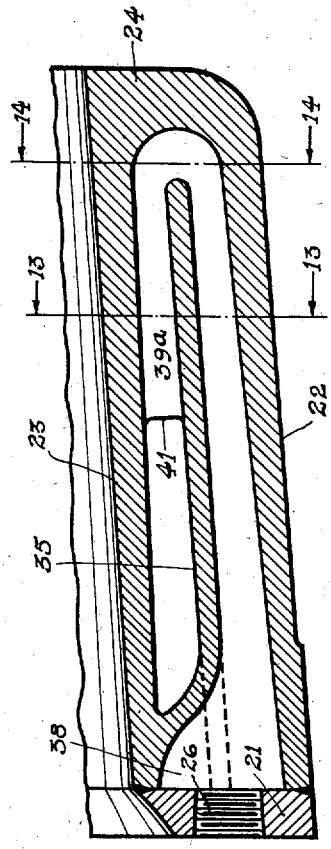
Figure 11 is a view on an enlarged scale showing a portion of the structure illustrated in Figure 9.
Figures 12, 13, 14:
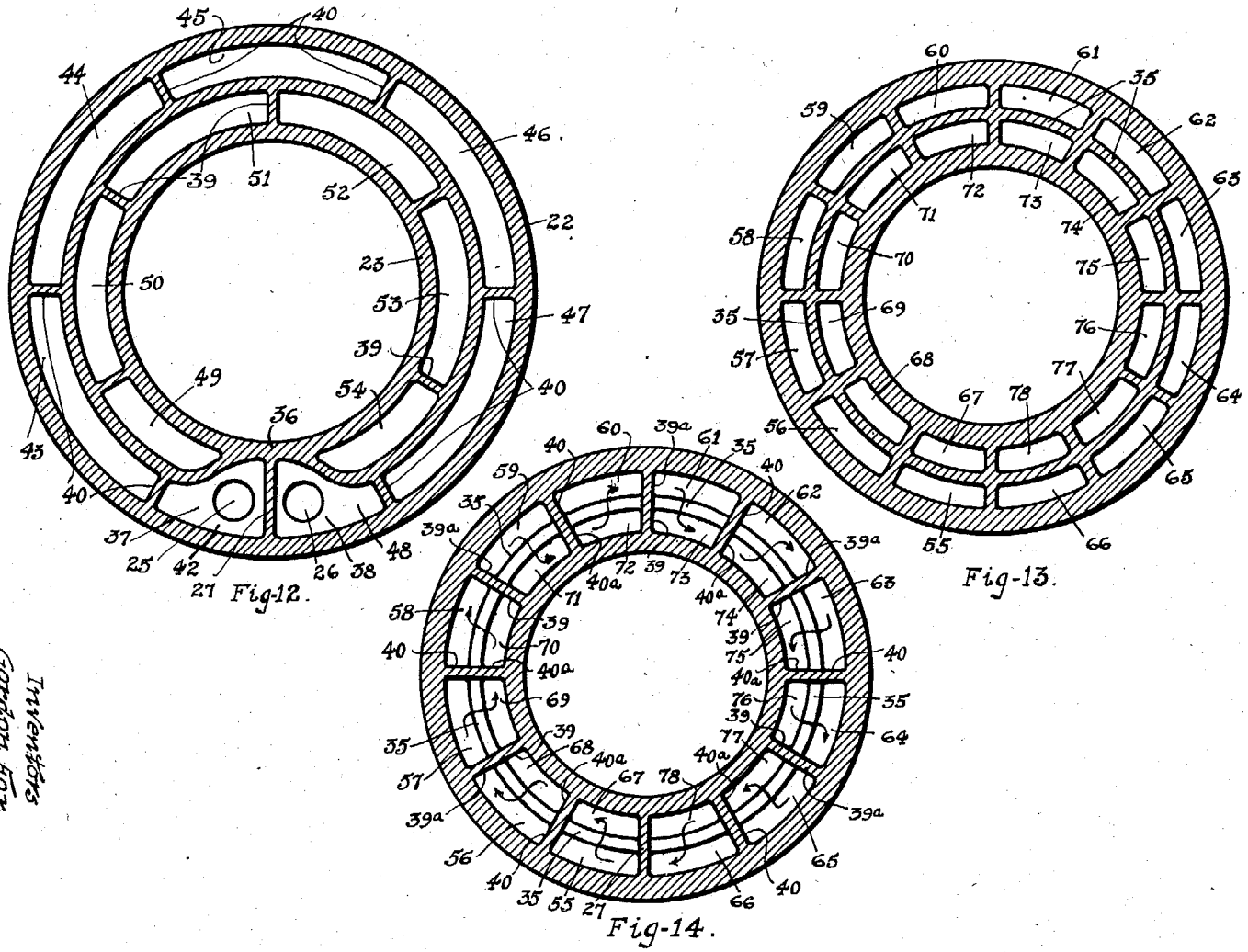
Figure 12 is a sectional view taken along the plane indicated by the arrows 12—12 of Figure 9.

Figure 13 is a sectional view taken along the plane indicated by the arrows 13—13 of Figures 9 and 11; and Figure 14 is a sectional view taken along the plane indicated by the arrows 14—14 of Figures 9 and 11.

Referring first to the embodiment of the present invention disclosed in Figures 1 to 7, said embodiment of the invention involves a two-part construction including the conical portion 20 and the back wall 21. It is at present preferred to embody the tuyère in these two parts for convenience of manufacture, though if preferred the tuyère could be cast in one piece. According to the illustrated construction, however, the conical portion 20 and the back wall 21 are welded or otherwise united to form a rigid unitary construction. The conical portion of the tuyère 20 includes the outer wall 22 and the inner wall 23, which walls are coaxially disposed relative to each other. Said walls 22 and 23 are united at the outer end of the tuyère by the nose wall 24. The annular space defined by the outer wall 22, inner wall 23 and nose wall 24 and back wall 21 constitutes a space for cooling fluid, and the present invention contemplates a construction of tuyère in which the cooling fluid is caused to enter from the rear end of the tuyère, passing directly to the nose portion of the tuyère, circulating back and forth longitudinally of the tuyère while it circulates circumferentially of the tuyère to the discharge point.

According to the structure shown in Figures 1 to 7, cooling fluid is admitted through the inlet opening 25 in the back wall 21 of the tuyère and is discharged through the outlet opening 26 located adjacent to said inlet opening 25. A partition wall 27 extends longitudinally of the tuyère between the coaxially disposed walls 22 and 23 from the back wall 21 to the nose wall 24. Said partition wall 27 is disposed between the inlet opening 25 and the discharge opening 26. Though only one inlet opening and one discharge opening are illustrated, it will be clear that a plurality of inlets and a corresponding number of outlets may be provided if preferred, a sufficient number of partition walls 27 being provided to insure the predetermined course of water from a certain inlet opening to a certain discharge opening, or that the inlet and outlet might be located in diametrically opposite parts of the back wall 21 and the water might pass in two parallel paths around the two halves of the tuyère, though the construction last mentioned is not preferred.

Water from the inlet opening 25 to the discharge opening 26 is directed in a predetermined path by means of a plurality of barriers, certain of which, indicated by the numerals 28—28, extend longitudinally from the back wall 21 toward the nose end of the tuyère. Said barriers 28—28 are radially disposed and are integrally united with the outer wall 22 and inner wall 23. Extending from the nose wall 24 toward the rear end of the tuyère are a plurality of radially disposed barriers 29—29, which barriers are integrally united with the nose wall 24, the outer wall 22 and the inner wall 23. Said barriers 29—29 are equispaced with respect to the barriers 28—28. Said barriers 29—29 extend to the region of and preferably beyond the extremities of the barriers 28—28, whereby water passing said barriers is forced to take a circuitous path, as clearly illustrated in Figure 7. In other words, there is preferably, though not necessarily, an overlapping relationship between the furthermost extremities of the barriers 28—28 and the rearmost extremities of the barriers 29—29. The barriers 29—29 are connected to the nose wall by rounded corners and tapered from the nose wall 24 in such a manner as to permit the ready flow of heat thereto from said nose wall 24. The forward extremities of the barriers 28 are spaced from the inner surface of the nose of the tuyère a distance approximately equal to the spacing of the barriers 28 from the barriers 29—29, whereby the flow of cooling medium outwardly past one side of a barrier 28 and inwardly past the other side of said barrier is substantially uniform. This structure in combination with the tapering of the barriers 29—29 and the rounding of the corners between said barriers 29—29 and the nose wall results in substantially uniform cross-sectional area in the passageway in the nose of the tuyère out between each barrier 29 and an adjacent barrier 28 and back between said barrier 28 and the next barrier 29 and insures effective contact at high velocity between the cooling medium and all portions of the metallic surfaces in the nose portion of the tuyère and practically eliminates the possibility of stagnant water and the formation of steam bubbles.

In addition to the barriers 28—28 and barriers 29—29, a partition 30 is provided, which partition is disposed coaxially with respect to the tuyère and extends inwardly from the nose wall 24 of the tuyère. Said partition is integral with the radially disposed barriers 29 and merges into said barriers in the manner illustrated in Figure 5. Said partition 30 is also integral with the forward extremities of the radially disposed barriers 28—28. Said partition 30 forms a circumferential series of channels 31 adjacent to the inner wall 23, which channels are bounded by the radially disposed barriers 29—29. Said partition 30 also forms a circumferential series of channels 32 with respect to the outer wall 22, said channels being bounded at their extremities by the radially disposed barriers 29—29. Said partition wall 30 adjacent to each channel 31 and channel 32 tapers as it approaches the radial barriers 29—29 to effect the efficient transfer of heat from the nose wall 24 and the region adjacent thereto to the cooling water being circulated through the channels 31 and 32. The barriers 28—28 are tapered from their region of juncture with the partition 30 to the back wall 21.

The partition 30 serves a quintuple function in that it helps to conduct heat from the nose portion of the tuyère in the vicinity between the barriers 29—29 to said barriers 29—29 and to said barriers 28—28. Said partition 30 also occupies a substantial amount of space and thereby restricts the cross-sectional area of the channels 31 and 32, thereby increasing the velocity of the cooling medium through these water channels. Said partition further divides the stream of cooling water into thin streams which thus have intimate contact with the cooling surfaces. Said partition 30 has the further function that it provides additional cooling surface. This partition further increases the amount of cool metal in the nose region of the tuyère, contributing to the absorptive ability of the metal of the tuyère to resist the substantially instantaneous effect of the splashing of molten metal within a blast furnace or the like.

It is preferred to so proportion the parts of the tuyère that the cross-sectional area of the channels 31 and 32 combined is only a small fraction of the water area of an ordinary water-cooled tuyère of the same outside dimensions. Inasmuch as all of the cooling fluid entering through the inlet 25 and discharging through the outlet 26 must pass through the channels 31 and 32, the velocity of the given quantity of water will be increased many times in that portion of the tuyère adjacent to the nose. This means that the heat dissipating surfaces in this portion of the tuyère will be many times as effective as they are in the ordinary water-cooled tuyère. Moreover, due to the radially disposed barriers 29 and the partition 30, the heat dissipating surfaces in the nose portion of applicants' tuyère have been increased very materially. The increase in cooling surface and the increase in velocity over prior practice and the forced intimacy of contact of a thin stream results in a multiplication of heat dissipating ability. As a result, the relatively high heat transfer according to the present invention between the tuyère and the water will be accomplished with a relatively small difference in temperature between the metallic wall and the cooling medium. In practice, due to the efficient heat transfer from the wall of the tuyère to the cooling fluid, no portions of the tuyère can attain a high temperature above the cooling medium. The low operating temperature of the tuyère metal has the advantage that it will greatly increase the safe absorptive ability of the metal in the nose part of the tuyère against the instantaneous effect of splashing of molten metal.

Due to the construction in which the outer wall 22 and inner wall 23 are connected by the barriers 28—28 and 29—29, which barriers are connected together by the partition 30, the advantage is obtained that the rate of heat transfer from the very hot portions of the tuyère to the cooler portions thereof is very greatly increased over prior practice. The barriers 28 and 29 and the partition 30 therefore have the function of facilitating the maintenance of relatively uniform temperatures throughout the tuyère, and in addition they act as mechanical struts to resist the compression and tension stresses in the various parts of the tuyère set up by such temperature differences that do exist in actual service.

Figure 7:
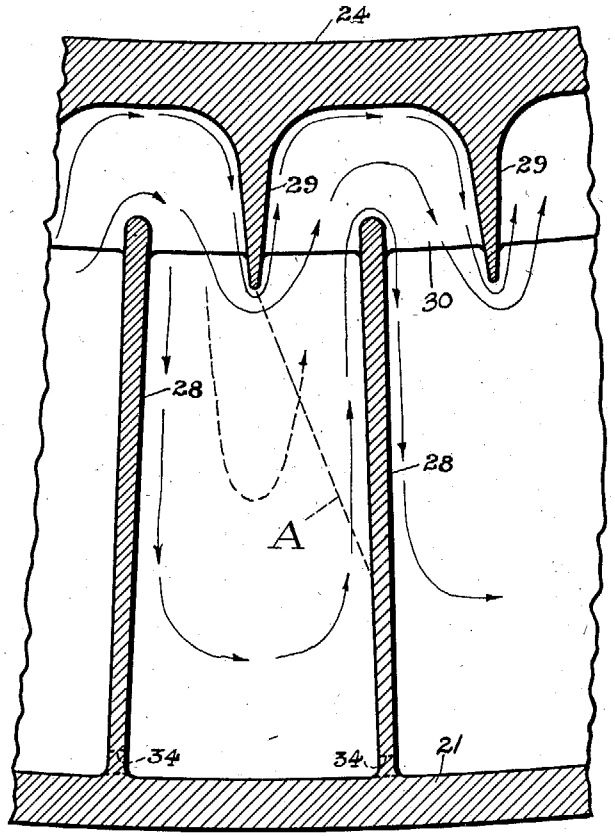
Figure 7 is a fragmentary view showing a development on a plane surface of the curved surface indicated by the arrows 7—7 of Figure 6.
Figure 6:
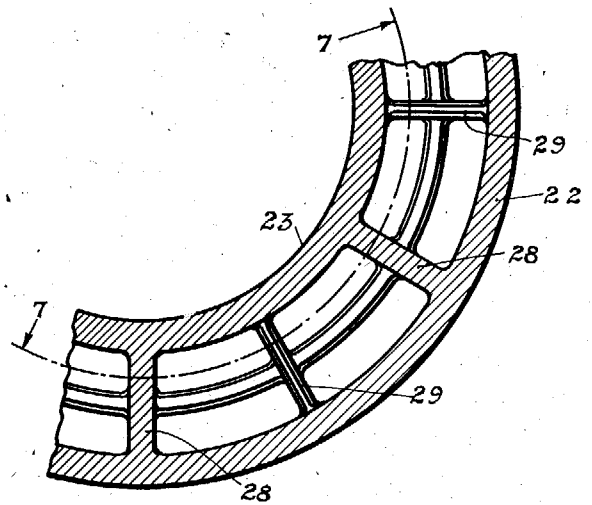
Figure 6 is a fragmentary view showing a section taken along the plane indicated by the arrows 6—6 of Figure 2.
Figure 10:
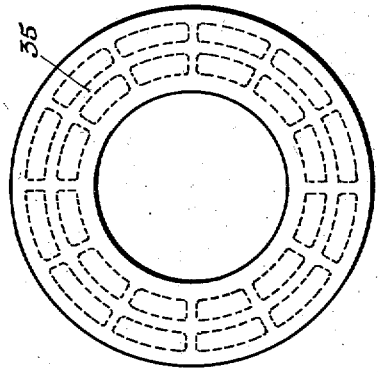
Figure 10 is an end view of the tuyère shown in Figures 8 and 9 but showing the nose end of said tuyère.

According to the preferred construction, the outer wall 22 and inner wall 23 should be tapered, that is—they should have a greater thickness in that portion of the tuyère adjacent to the nose wall 24 than in that portion of the tuyère adjacent to the base. This design has a double function of improving the ability of heat to pass from the nose wall 24 toward the base of the tuyère and restricting the passage for the flow of water near the nose of the tuyère, thereby increasing the velocity of the cooling fluid near the nose of the tuyère. The increased velocity near the nose of the tuyère is due to the reduced cross-sectional area of the passageway in the nose portion. The passageway in the nose defined by the barriers 29—29 and the adjacent end of the intermediate barriers 28—28 is less than half of the average cross-sectional area of said passageway in the base portion of the tuyère. In Figure 7 the broken line indicated by the letter A defines a plane located approximately at the region of mean cross-sectional area of the base portion of the tuyère.

It will be noted that in the tuyère above described, the water passing through the channels 31 and 32 is caused to impinge upon the surfaces of the barriers 29—29 and against the inner surface of the nose wall 24. The cooling medium, therefore, has a scrubbing action upon the walls referred to, tending to carry away quickly any bubbles which might be formed. This characteristic is valuable in emergencies when hot molten metal contacts with the nose of the tuyère. In such cases the greatly accelerated heat dissipation and the scrubbing action referred to are very valuable in preventing the rapid accumulation of steam bubbles at the nose of the tuyère.

Though under all ordinary conditions the accumulation of bubbles of steam within the tuyère will be avoided in the practice of the present invention because of its low operating temperature, emergency conditions may be encountered such that bubbles of steam will be formed. To avoid the possibility of the tuyère becoming steam-bound, small openings 33 and 34 may be provided in the barriers 28—28 at the region adjacent to the rear portion 21. Referring to Figure 4, it will be noted that the barrier 28 illustrated therein has an opening 33 therethrough at its corner adjacent to the rear wall 21 and the inner wall 22. Said barrier 28 also has the opening 34 extending therethrough at the corner adjacent to the rear wall 21 and the outer wall 23. Said openings 33 and 34 in the various barriers 28—28 will permit steam or air to pass readily around the tuyère to a point or points where they can be discharged. Inasmuch as bubbles of steam or air tend to rise in water, which will be the preferred cooling medium, the inlet opening 25 and the discharge opening 26 should be placed uppermost to facilitate the discharge of such steam or air bubbles.

Referring now to the embodiment of the present invention illustrated in Figures 8 to 14, inclusive, the numerals 21, 22, 23 and 24 indicate, respectively, the rear wall, the outer wall, the inner wall, and the nose wall of the tuyère, said rear wall 21 being welded or otherwise rigidly united to the rear extremities of the outer wall 22 and the inner wall 23. The rear wall 21 is provided with the inlet opening 25 and the outlet opening 26. A partition wall 27 is provided between the inlet opening 25 and the outlet opening 26, which partition wall is disposed radially of the tuyère and is integrally united with the outer wall 22 and the inner wall 23. Said partition wall extends the length of the tuyère from the rear wall 21 to the nose wall 24 to prevent the short-circuiting of the cooling fluid from the inlet opening 25 to the outlet opening 26.

The jacket provided by the rear wall 21, outer wall 22, inner wall 23 and nose wall 24 is provided with a plurality of barriers to cause the cooling medium flowing from the inlet opening 25 to the outlet opening 26 to take a circuitous path, the flow of cooling medium adjacent to the nose of the tuyère being at high velocity. One of the barriers referred to is indicated by the numeral 35, which barrier is disposed circumferentially of the tuyère and is for the greater part of its length circular in cross section, dividing the space between the outer wall 22 and the inner wall 23 into two annular spaces disposed coaxially with respect to the tuyère. Said barrier 35 is intended to merge with the inner wall 23 at a region 36 adjacent to and between the inlet opening 25 and the outlet opening 26 whereby to provide an inlet pocket 37 communicating with the inlet opening 25 and an outlet pocket 38 communicating with the outlet opening 26. Said barrier 35 extends from the rear wall 21 to a region adjacent to but spaced from the inner surface of the nose wall 24.

Disposed in spaced relationship with the region 36 and with one another are a plurality of radial barriers 39 extending from the inner wall 23 to said barrier 35. Said barriers 39—39 extend from the rear wall 21 to the nose wall 24, merging into said nose wall 24 and being integral therewith. Radially disposed relative to the tuyère are a plurality of barriers 40—40 extending between the barrier 35 and the outer wall 22 of the tuyère. Said barriers 40—40 extend from the rear wall 21 to the nose wall 24, merging into said nose wall 24 and being integral therewith. Said barriers 40—40 are disposed symmetrically with respect to the barriers 39, the radial planes marking the barriers 40—40 being spaced substantially midway between the radial planes marking the barriers 39—39. Disposed in radial planes coincident with the barriers 39—39 are short barriers extending from the inner surface of the nose wall 24 to the plane indicated by the numeral 41. Said short barriers are indicated by the numerals 39*a*—39*a* and extend between the inner wall 23 and the annular barrier 35. Disposed in radial planes coincident with the barriers 40—40 are short barriers extending from the inner surface of the nose wall 24 to the plane indicated by the numeral 41. These last mentioned short barriers are indicated by the numerals 40*a*—40*a* and extend between the annular barrier 35 and the outer wall 22.

The barriers 40 form a plurality of passages adjacent to the rear end of the tuyère, which passages are disposed just inside of the outer wall 22 of the tuyère. Said passages, reading in a counterclockwise direction in Figure 12, bear the numerals 42 (which is a continuation of the inlet pocket 37), 43, 44, 45, 46, 47 and 48. Said passage 48 communicates with the outlet pocket 38 communicating with the outlet opening 26. Disposed symmetrically with the passages 42 to 48, inclusive, is a series of passages defined by the barriers 39—39, which passages are located adjacent to the inner wall 23 of the tuyère. Said passages, reading in a counterclockwise direction in Figure 12, bear the numerals 49, 50, 51, 52, 53 and 54. The barriers 39*a* and 40*a* provide a plurality of channels communicating with the passages 42 to 48, inclusive, and the passages 49 to 54, inclusive. Said channels, reading in a clockwise direction in Figures 13 and 14, bear the numerals 55, 56, 57, 58, 59, 60, 61, 62, 63, 64, 65 and 66 disposed circumferentially in proximity to the outer wall 22 of the tuyère and the channels 67, 68, 69, 70, 71, 72, 73, 74, 75, 76, 77 and 78 disposed circumferentially in proximity to the inner wall 23 of the tuyère. Remembering that the annular barrier 35 stops short of the nose wall 24 of the tuyère, it will be noted that a continuous circuitous path is provided for the cooling medium from the inlet opening 25 to the outlet opening 26, which path conducts the cooling medium back and forth longitudinally of the tuyère along the short barriers 39*a* and 40*a* through the channels just referred to.

Tracing the course of the cooling medium, entry is made through the inlet opening 25 and inlet opening pocket 37 to the passage 42 into the channel 55. Said cooling medium passes around the forward extremity of the annular barrier 35 into the channel 67 in the direction of the arrow between said channels in Figure 14. Said cooling medium passes rearwardly around the rear extremity of the corresponding short barrier 40*a*, thence forwardly in channel 68, past the forward extremity of the annular barrier 35 into the channel 56, thence rearwardly around the rear extremity of the short barrier 39*a*, and then forwardly in the channel 57, rearwardly in channel 69, forwardly in channel 70, rearwardly in channel 58, forwardly in channel 59, rearwardly in channel 71, forwardly in channel 72, rearwardly in channel 60, forwardly in channel 61, rearwardly in channel 73, forwardly in channel 74, rearwardly in channel 62 forwardly in channel 63, rearwardly in channel 75, forwardly in channel 76, rearwardly in channel 64, forwardly in channel 65, rearwardly in channel 77, forwardly in channel 78, rearwardly in channel 66. Said channel 66 communicates with the passage 48, outlet pocket 38 and outlet opening 26.

The outer wall 22, the inner wall 23, the annular barrier 35, and the radial barriers 39, 40, 39*a* and 40*a* all decrease in thickness from the region of the nose of the tuyère toward the rear of the tuyère, thereby facilitating the transfer of heat from the nose toward the cooler portions of the tuyère.

The radially disposed barriers serve not only as struts for resisting mechanical stresses but act as efficient heat conveyers to convey heat units from very hot portions of the tuyère to the cooler portions thereof, preventing the raising of any portion of the tuyère to destructive temperatures and minimizing the tendency to produce internal stresses. By reason of the radially disposed barriers and the annular barrier, a large area of cooling surface is provided and the velocity of the cooling medium through the tuyère, and particularly in the nose portion thereof, is increased over prior practice. Moreover, the water is caused to pass the surfaces in a thin stream and thus to make intimate contact therewith. Moreover, all the cooling water is caused to pass all areas of the nose portion of the tuyère. Though only one inlet opening and one discharge opening are illustrated, it will be clear that a plurality of inlets and a corresponding number of outlets may be provided if preferred, a sufficient number of partition walls 27 being provided to insure the predetermined course of water from a certain inlet opening to a certain discharge opening, or that the inlet nd outlet might be located in diametrically opposite parts of the back wall 21 and the water might pass in two parallel paths around the two halves of the tuyère, though, as stated above, the construction last mentioned is not preferred.

Though certain preferred embodiments of the present invention have been described in detail, many modifications will occur to those skilled in the art. It is intended to cover all such modifications that fall within the scope of the appended claims.

What is claimed is—

1. In a tuyère, in combination, walls providing an annular jacket for cooling medium, one of said walls having therein a water inlet and a water outlet, radial barriers in said jacket adjoining the nose of said tuyère, and means in said tuyère including partition means extending throughout the length of said annular jacket for causing cooling medium to flow back and forth in a single stream along said barriers while traveling circumferentially with respect to said tuyère from said inlet opening to said outlet opening.

2. In a tuyère, in combination, walls providing an annular jacket for cooling medium, one of said walls having therein a water inlet and a water outlet, a plurality of radially disposed barriers in said jacket extending rearwardly from the nose of said tuyère, a plurality of other radially disposed barriers extending from the rear of said tuyère to the region of the rearmost extremities of said first-mentioned barriers, said other barriers being spaced circumferentially with respect to said first-mentioned barriers, and partition means extending throughout the length of said annular jacket for limiting the flow of cooling medium from said inlet to said outlet to a single stream.

3. In a tuyère, in combination, walls providing an annular jacket for cooling medium, a plurality of radially disposed barriers in said jacket extending rearwardly from the nose of said tuyère, a plurality of other radially disposed barriers extending from the rear of said tuyère to the region of the rearmost extremities of said first-mentioned barriers, said other barriers being spaced circumferentially with respect to said first-mentioned barriers, and a circumferential partition wall extending from the nose of said tuyère into said jacket coaxially disposed with respect to said tuyère and dividing said jacket adjacent to the nose of said tuyère into radially spaced channels, said partition forming a junction between said first-mentioned barriers and said other barriers.

4. In a tuyère, in combination, walls providing an annular jacket for cooling medium, a plurality of radially disposed barriers in said jacket extending rearwardly from the nose of said tuyère, a plurality of other radially disposed barriers extending from the rear of said tuyère to the region of the rearmost extremities of said first-mentioned barriers, said other barriers being spaced circumferentially with respect to said first-mentioned barriers, and a circumferential partition wall extending from the nose of said tuyère into said jacket coaxially disposed with respect to said tuyère and dividing said jacket adjacent to the nose of said tuyère into radially spaced channels, said first-mentioned barriers tapering in cross-sectional area from the nose end to the rear end of said tuyère.

5. In a tuyère, in combination, walls providing an annular jacket for cooling medium, one of said walls having therein a water inlet and a water outlet, a plurality of radially disposed barriers in said jacket extending rearwardly from the nose of said tuyère, a plurality of other radially disposed barriers extending from the rear of said tuyère to the region of the rearmost extremities of said first-mentioned barriers, said other barriers being spaced circumferentially with respect to said first-mentioned barriers, and partition means extending throughout the length of said annular jacket for limiting the flow of cooling medium from said inlet to said outlet to a single stream, said other barriers having openings therein adjacent to the rear of said tuyère.

6. In a tuyère, in combination, walls providing an annular jacket for cooling medium, an inlet opening and an outlet opening communicating with said jacket, a partition wall dividing said jacket throughout the length thereof to prevent the short-circuiting of cooling medium from said inlet opening to said outlet opening, and barriers disposed within said jacket for causing cooling medium to flow back and forth longitudinally of the tuyère in passing from said inlet opening to said outlet opening.

7. In a tuyère, in combination, walls providing an annular jacket for cooling medium, an annular barrier disposed within said jacket and extending from the rear of said tuyère to a region adjacent to but spaced from the nose end of said tuyère, and radially disposed barriers joining with said annular barrier and arranged for causing cooling medium in said jacket to flow back and forth longitudinally of said tuyère while traveling circumferentially thereof.

8. In a tuyère, in combination, walls providing an annular jacket for cooling medium, an annular barrier disposed within said jacket and extending from the rear of said tuyère to a region adjacent to but spaced from the nose end of said tuyère, and radially disposed barriers joining with said annular barrier and arranged for causing cooling medium in said jacket to flow in a tortuous course progressively, longitudinally, radially and circumferentially of said tuyère.

9. In a tuyère, in combination, walls providing an annular jacket for cooling medium, an inlet opening and an outlet opening communicating with said jacket, a partition wall dividing said jacket throughout the length thereof to prevent short-circuiting of cooling medium from said inlet opening to said outlet opening, a plurality of radially disposed barriers in said jacket extending rearwardly from the nose of said tuyère and tapering in cross-sectional area from the nose toward the rear end of said tuyère, and a plurality of other radially disposed barriers extending from the rear of said tuyère, said other barriers being spaced circumferentially with respect to said first-mentioned barriers.

10. In a tuyère, in combination, walls providing an annular jacket for cooling medium, an inlet opening and an outlet opening communicating with said jacket, a plurality of radially disposed barriers in said jacket extending rearwardly from the nose of said tuyère and a plurality of other radially disposed barriers extending from the rear of said tuyère, said other barriers being spaced circumferentially with respect to said first-mentioned barriers and a circumferential partition wall extending from the nose of said tuyère into said jacket coaxially disposed with respect to said tuyère and dividing said jacket adjacent to the nose of said tuyère into radially spaced channels.

11. In a tuyère, in combination, walls providing an annular jacket for cooling medium, an inlet opening and an outlet opening communicating with said jacket, a partition wall dividing said jacket to prevent short-circuiting of cooling medium from said inlet opening to said outlet opening, a plurality of radially disposed barriers in said jacket extending rearwardly from the nose of said tuyère and a plurality of other radially disposed barriers extending from the rear of said tuyère, said other barriers being spaced circumferentially with respect to said first-mentioned barriers and a circumferential partition wall extending from the nose of said tuyère into said jacket coaxially disposed with respect to said tuyère and dividing said jacket adjacent to the nose of said tuyère into radially spaced channels.

12. In a tuyère, in combination, walls providing an annular jacket for cooling medium, an annular barrier disposed within said jacket dividing said jacket into inner and outer compartments, radially disposed barriers joining with said annular barrier, said annular barrier providing communication between said inner and outer compartments at a region adjacent to the nose of said tuyère, said annular barrier and said radially disposed barriers defining a circuitous path for cooling medium back and forth longitudinally of said tuyère and circumferentially of said tuyère.

13. In a tuyère, in combination, an inner wall, an outer wall, a nose wall, and a back wall providing an annular jacket for cooling medium, a plurality of radially disposed barriers in said jacket extending rearwardlly from the nose of said tuyère and tapering in cross-sectional area from the nose toward the rear end of said tuyère, a plurality of other radially disposed barriers extending from the rear of said tuyère, said other barriers being spaced circumferentially with respect to said first-mentioned barriers, said inner wall and said outer wall decreasing in cross-section from said nose wall toward said back wall, and a circumferential partition wall extending from said nose wall into said jacket, said circumferential partition wall decreasing in cross-section rearwardly from said nose wall.

14. In a tuyère, in combination, walls providing an annular jacket for cooling medium, a plurality of radially disposed barriers in said jacket extending rearwardly from the nose of said tuyère, a plurality of other radially disposed barriers extending from the rear of said tuyère to the region of the rearmost extremities of said first-mentioned barriers, said other barriers being spaced circumferentially with respect to said first-mentioned barriers, and a circumferential partition wall extending from the nose of said tuyère into said jacket coaxially disposed with respect to said tuyère and dividing said jacket adjacent to the nose of said tuyère into radially spaced channels, said first-mentioned barriers tapering in cross-sectional area from the nose end of the tuyère rearwardly.

15. In a tuyère, in combination, walls providing an annular jacket for cooling medium, radially disposed barriers in said jacket extending rearwardly from the nose of said tuyère, and a plurality of other radially disposed barriers extending from the rear of said tuyère, said other barriers being spaced circumferentially with respect to said first-mentioned barriers, said first-mentioned barriers extending rearwardly to the region of the forward extremities of said other barriers, the spacing between the forward extremities of said other barriers and the inner wall of the nose of said tuyère being approximately equal to the spacing of said other barriers with respect to said first-mentioned barriers.

16. In a tuyère, in combination, walls providing an annular jacket for cooling medium, a plurality of radially disposed barriers in said jacket extending rearwardly from the nose of said tuyère, and a plurality of other radially disposed barriers extending from the rear of said tuyère to the region of the rearmost extremities of said first-mentioned barriers, said other barriers being spaced circumferentially with respect to said first-mentioned barriers whereby to provide a series passageway for the flow of cooling medium, the cross sectional area of said passageway in the nose of said tuyère defined by said barriers being less than half of the average cross-sectional area of said passageway in the base of said tuyère defined by said barriers.

17. In a tuyère, in combination, walls providing an annular jacket for cooling medium, radially disposed barriers in said jacket extending rearwardly from the nose of said tuyère, and a plurality of other radially disposed barriers extending from the rear of said tuyère, said other barriers being spaced circumferentially with respect to said first-mentioned barriers whereby to provide passageways in said jacket at the nose of said tuyère, said passageways in the nose of said tuyère being of substantially uniform cross-sectional area in the portions thereof defined by the forward extremity of each of said other barriers and the neighboring first-mentioned barriers adjacent thereto.

18. In a tuyère, in combination, walls providing an annular jacket for cooling medium, radially disposed barriers in said jacket extending rearwardly from the nose of said tuyère, and a plurality of other radially disposed barriers extending from the rear of said tuyère, said other barriers being circumferentially spaced with respect to said first-mentioned barriers, said first-mentioned barriers being located only in the nose region of said tuyère, said first mentioned barriers and said other barriers extending substantially to the same region longitudinally of said tuyère.

19. In a tuyère, in combination, a nose wall, an inner side wall, an outer side wall and a back wall providing an annular jacket for cooling medium, said back wall having an inlet opening and an outlet opening, and means within said jacket for speeding up the flow of cooling medium in the nose portion of said tuyère relative to the flow of said medium in the portion of said tuyère adjacent to said back wall, the thickness of a side wall of said tuyère decreasing from the nose of said tuyère toward the rear thereof, said tuyère including partition means extending throughout the length of said annular jacket and barrier means for causing cooling medium to flow in a single stream back and forth circumferentially and longitudinally of said tuyère from said inlet opening to said outlet opening.

20. In a tuyère, in combination, walls providing an annular jacket for cooling medium, a circumferentially disposed partition wall in said jacket extending from the nose of said tuyère coaxially with respect to said tuyère and dividing said jacket adjacent to the nose of said tuyère into radially spaced channels, and other partition means within said jacket providing a series passageway for the flow of cooling medium back and forth longitudinally and circumferentially of said tuyère through the nose region and the base region of said tuyère, the cross-sectional area of said passageway in the nose region of said tuyère being less than half the average cross-sectional area of said passageway in the base region of said tuyère.

21. In a tuyère, in combination, walls providing an annular jacket for cooling medium, a circumferentially disposed partition wall in said jacket extending from the nose of said tuyère coaxially with respect to said tuyère and dividing said jacket adjacent to the nose of said tuyère into radially spaced channels, and partition means within said jacket for causing series flow of cooling medium through the nose portion and the base portion of said tuyère and for speeding up the flow of cooling medium throughout the nose portion of said tuyère relative to the flow of said medium in the portion of the tuyère adjacent to the base portion of said tuyère.

22. In a tuyère, in combination, walls providing an annular jacket, said walls having an inlet and an outlet for the flow of cooling medium, and means for directing cooling medium in a single tortuous series path from said inlet to said outlet longitudinally and circumferentially of said tuyère, the thickness of a side wall of said tuyère decreasing from the nose region of said tuyère toward the rear thereof.

GORDON FOX.
ARTHUR J. WHITCOMB.